US 9,759,340 B2

(12) United States Patent
Kinser et al.

(10) Patent No.: US 9,759,340 B2
(45) Date of Patent: Sep. 12, 2017

(54) METHODS AND APPRATUS FOR INDEPENDENTLY CONTROLLING SEATING FORCES IN ROTARY VALVES

(71) Applicant: Fisher Controls International LLC, Marshalltown, IA (US)

(72) Inventors: Andrew John Kinser, Marshalltown, IA (US); Michael Allen Wyatt, Marshalltown, IA (US); Trent Frank Jackson, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 14/977,104

(22) Filed: Dec. 21, 2015

(65) Prior Publication Data
US 2017/0175909 A1 Jun. 22, 2017

(51) Int. Cl.
| | |
|---|---|
| F16K 17/02 | (2006.01) |
| F16K 1/34 | (2006.01) |
| F15B 15/06 | (2006.01) |
| F16K 31/363 | (2006.01) |
| F16K 1/22 | (2006.01) |

(52) U.S. Cl.
CPC ............ *F16K 17/02* (2013.01); *F15B 15/063* (2013.01); *F16K 1/22* (2013.01); *F16K 1/34* (2013.01); *F16K 31/363* (2013.01)

(58) Field of Classification Search
CPC .... F16K 17/02; F16K 1/34; F16K 1/16–1/22; F16K 31/363; F15B 15/063
USPC .............. 251/62–63.6, 304–317.01, 229, 58; 92/31–33; 137/511
See application file for complete search history.

(56) References Cited

U.S. PATENT DOCUMENTS

| | | | | |
|---|---|---|---|---|
| 2,053,668 | A | * 9/1936 | Kinzie | ................. F16K 31/122 251/305 |
| 2,910,266 | A | * 10/1959 | Condello et al. | ..... F16K 31/363 251/305 |

(Continued)

OTHER PUBLICATIONS

Emerson Process Management, "Fisher TM 1061 Pneumatic Piston Rotary Actuator with Style F & G Mounting Adaptations", Instruction Manual, 1992 and Jan. 2016, 24 pages.

(Continued)

*Primary Examiner* — John Bastianelli
(74) *Attorney, Agent, or Firm* — Hanley, Flight & Zimmerman, LLC (57) ABSTRACT

Example methods and apparatus independently control the seating force in a rotary valve. An example apparatus includes a rotary valve having a flow control member and a dual-acting actuator operatively coupled to the rotary valve. The actuator has first and second ports to receive a pressurized control fluid to change a position of the actuator. The example apparatus further includes a valve controller operatively coupled to the actuator to control the pressurized control fluid in response to a position of the rotary valve. The example apparatus further includes a pressure limiter operatively coupled to the valve controller and fluidly coupled to the first port of the actuator. The pressure limiter is to reduce a pressure of the pressurized fluid provided to the first port of the actuator to reduce a seating force of the flow control member when the rotary valve is in a closed position.

17 Claims, 4 Drawing Sheets

(56) References Cited

U.S. PATENT DOCUMENTS

| | | | | |
|---|---|---|---|---|
| 3,260,496 | A * | 7/1966 | Borcherdt | F16K 1/2263 251/58 |
| 3,982,725 | A * | 9/1976 | Clark | F15B 15/065 251/58 |
| 4,545,289 | A * | 10/1985 | Weyer | F15B 15/068 92/33 |
| 4,882,979 | A * | 11/1989 | Weyer | F15B 15/068 251/229 |
| 4,949,936 | A * | 8/1990 | Messina | F15B 15/065 251/229 |
| 5,170,693 | A * | 12/1992 | Stary | F16K 31/1635 92/32 |
| 6,173,740 | B1 * | 1/2001 | Marinoni | F15B 15/065 251/31 |
| 6,354,327 | B1 | 3/2002 | Mayhew | |
| 6,651,687 | B2 * | 11/2003 | Taylor | F16K 17/40 251/58 |
| 7,584,692 | B2 * | 9/2009 | Rebecchi | F15B 15/068 92/31 |
| 8,413,486 | B1 | 4/2013 | Al-Buaijan | |
| 2010/0083651 | A1 | 4/2010 | Hristov et al. | |
| 2015/0316158 | A1 | 11/2015 | Winkler et al. | |

OTHER PUBLICATIONS

Emerson Process Management, "Type 8532 High Performance Butterfly Valve", Instruction Manual, Nov. 2007, 24 pages.
Emerson Process Management, "Fisher Fieldvue DVC6200 Digital Valve Controller", Instruction Manual, Dec. 2013, 148 pages.
International Searching Authority, "International Search Report and Written Opinion," issued in connection with International Application No. PCT/US2016/067907, dated Feb. 22, 2017, 12 pages.

* cited by examiner

METHODS AND APPRATUS FOR INDEPENDENTLY CONTROLLING SEATING FORCES IN ROTARY VALVES

FIELD OF THE DISCLOSURE

This disclosure relates generally to rotary valves and, more particularly, to methods and apparatus for independently controlling seating forces in rotary valves.

BACKGROUND

Conventional control valve applications implementing a valve controller and a dual-acting actuator provide maximum actuator forces or loads that are generally uniform with respect to the opening and closing of a valve that is operatively coupled to the actuator. In valve applications that require a greater breakout torque, force or load to open the valve relative to the seating torque, force or load required to close the valve, the application of uniform opening and closing forces by a dual-acting actuator may create an excessive seating force in the valve. Excessive seating forces may result in premature wear of and/or damage to the valve components, which may adversely impact the ability of the valve to maintain an effective seal upon closing.

SUMMARY

Example methods and apparatus for independently controlling the seating torque, force or load in a rotary valve are described. An example apparatus includes a rotary valve having a flow control member. The example apparatus further includes a dual-acting actuator operatively coupled to the rotary valve. The dual-acting actuator has first and second ports to receive a pressurized control fluid to change a position of the dual-acting actuator. The example apparatus further includes a valve controller operatively coupled to the dual-acting actuator to control the pressurized control fluid in response to a position of the rotary valve. The example apparatus further includes a pressure limiter operatively coupled to the valve controller and fluidly coupled to the first port of the actuator. The pressure limiter is to reduce a pressure of the pressurized fluid provided to the first port of the actuator to reduce a seating force of the flow control member when the rotary valve is in a closed position.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

The example methods and apparatus described herein provide for independent control of the seating force applied to a rotary valve. Conventional control valve applications implementing a valve controller and a dual-acting actuator provide maximum actuator forces that are generally uniform with respect to the opening and closing of a valve that is operatively coupled to the actuator. Unlike these conventional control valve applications, the example methods and apparatus described herein provide for the seating force to be independently controlled such that the seating force applied to close the valve may be less than the breakout force applied to open the valve.

The example methods and apparatus described herein are particularly advantageous in valve applications such as, for example, a torque seated rotary valve, where a breakout torque, force or load required to open the valve may be substantially greater than a seating torque, force or load required to close the valve. By enabling the seating force to be independently controlled such that the applied seating force is less than the applied breakout force, the example methods and apparatus described herein reduce and/or prevent the application of excessive seating forces in the valve, thereby reducing and/or preventing instances of premature wear of and/or damage to the valve components. As a result, the lifespan over which the valve can maintain an effective seal upon closing is increased.

In some disclosed examples, the apparatus includes a rotary valve having a flow control member. In some disclosed examples, the rotary valve is a torque seated rotary valve. In some disclosed examples, the apparatus further includes a dual-acting actuator operatively coupled to the rotary valve. In such disclosed examples, the dual-acting actuator has first and second ports to receive a pressurized control fluid to change a position of the dual-acting actuator. In some disclosed examples, the dual-acting actuator is a pneumatic piston rotary actuator. In some disclosed examples, the apparatus further includes a valve controller operatively coupled to the dual-acting actuator to control the pressurized control fluid in response to a position of the rotary valve. In some disclosed examples, the valve controller is a digital valve controller. In some disclosed examples, the valve controller includes a relay to control a distribution of the pressurized control fluid to the first and second ports of the dual-acting actuator.

In some disclosed examples, the apparatus further includes a pressure limiter operatively coupled to the valve controller and fluidly coupled to the first port of the actuator. In such disclosed examples, the pressure limiter is to reduce a pressure of the pressurized fluid provided to the first port of the actuator to reduce a seating force of the flow control member when the rotary valve is in a closed position. In some such disclosed examples, a pressure of the pressurized fluid provided to the second port of the actuator provides an opening force of the flow control member, the opening force being greater than the seating force. In some disclosed examples, the pressure limiter is integrated within the valve controller. In some disclosed examples, the pressure limiter is electronically configurable. In some disclosed examples, the pressure limiter is a pressure regulator. In other disclosed examples, the pressure limiter is a pressure relief valve.

Figure 1:
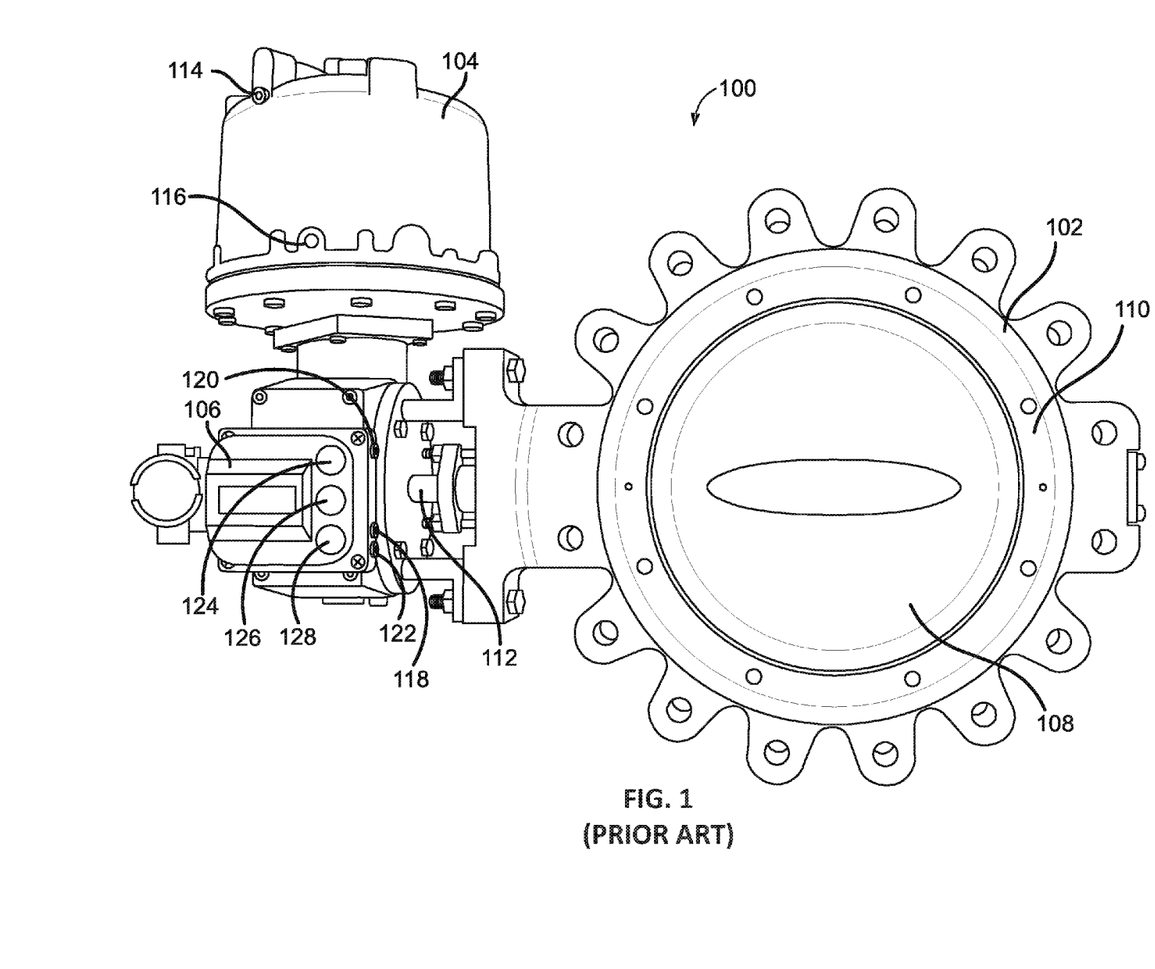
FIG. 1 illustrates a known control valve apparatus.
Figure 2:
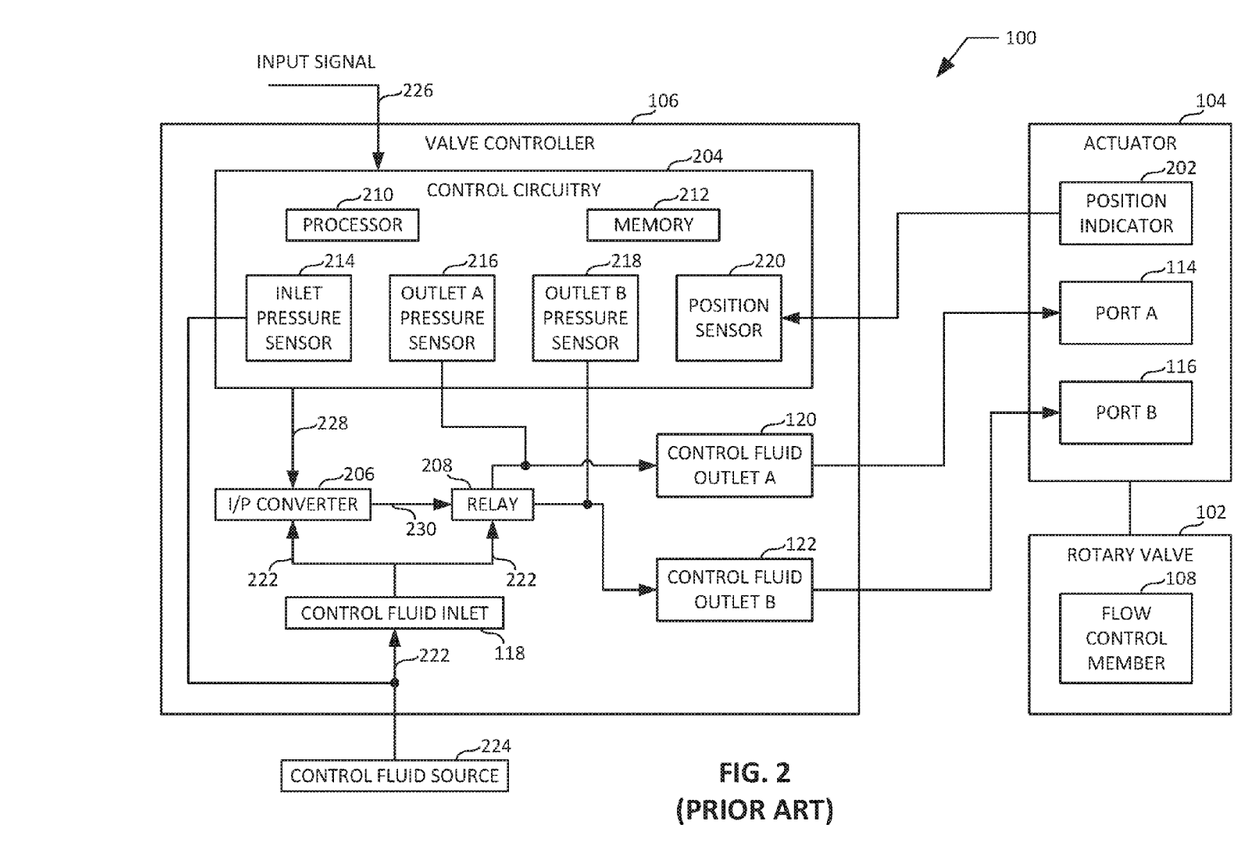
FIG. 2 is a block diagram of the control valve apparatus of FIG. 1.

Before describing the details of the example methods and apparatus for independently controlling the seating force applied to a rotary valve, a description of a known control valve apparatus 100 is provided in connection with FIGS. 1 and 2.

FIG. 1 illustrates the known control valve apparatus 100 including a rotary valve 102, a dual-acting actuator 104 and a valve controller 106. The rotary valve 102 of FIG. 1 is a torque seated rotary valve. More specifically, the rotary valve 102 of FIG. 1 is a torque seated butterfly valve. The rotary valve 102 may be, for example, a Fisher® Model 8532 butterfly valve. The rotary valve 102 includes a flow control member 108, a valve body 110, a valve seat (not shown) positioned within the valve body 110, and a valve shaft 112. The flow control member 108 of FIG. 1 is a valve disc. The flow control member 108 is operatively coupled to the valve shaft 112. Upon the application of a torque, rotational load and/or rotational force to the valve shaft 112, the flow control member 108 rotates relative to the valve body 110 between a closed position (e.g., a seated position) of the rotary valve 102 (as shown in FIG. 1) and an open position (e.g., an unseated position) of the rotary valve 102.

The dual-acting actuator 104 of FIG. 1 is a pneumatic piston rotary actuator. The dual-acting actuator 104 may be, for example, a Fisher® Model 1061 pneumatic piston rotary actuator. The dual-acting actuator 104 is operatively coupled to the rotary valve 102 and, more specifically, to the valve shaft 112 of the rotary valve 102. The dual-acting actuator 104 includes first and second ports 114, 116 and an internal piston (not shown). The first and second ports 114, 116 respectively receive a pressurized control fluid such as, for example, pressurized air that causes the piston to translate in a corresponding direction along a longitudinal axis of the dual-acting actuator 104. For example, receipt of the pressurized control fluid at the first port 114 may cause the piston to translate in a first direction along the longitudinal axis of the dual-acting actuator, while receipt of the pressurized control fluid at the second port 116 may cause the piston to translate in a second direction along the longitudinal axis that is opposite the first direction. A force and/or load generated by the translating piston is transformed into a torque, rotational force and/or rotational load on the valve shaft 112, which causes the flow control member 108 to rotate relative to the valve body 110, as described above. The operative coupling of the piston to the valve shaft 112 and/or the flow control member 108 results in a correlation between the position of the piston and the position of the flow control member 108. Accordingly, a position of the flow control member 108 may be determined based on a known and/or measured position of the piston, and vice-versa.

The valve controller 106 of FIG. 1 is a digital valve controller. The valve controller 106 may be, for example, a Fisher® FIELDVUE DVC6200 Series digital valve controller. The valve controller 106 is operatively coupled to the dual-acting actuator 104 to control the supply of pressurized control fluid to the dual-acting actuator 104. The valve controller 106 includes an inlet 118 that receives a pressurized control fluid such as, for example, pressurized air from a pressurized control fluid source (not shown). The valve controller 106 further includes first and second outlets 120, 122 for respectively supplying the pressurized control fluid to the first and second ports 114, 116 of the dual-acting actuator 104. Although not shown in FIG. 1, in operation of the known control valve apparatus 100, the first outlet 120 of the valve controller 106 is fluidly coupled to the first port 114 of the dual-acting actuator 104 via a first conduit, while the second outlet 122 of the valve controller 106 is fluidly coupled to the second port 116 of the dual-acting actuator 104 via a second conduit. The valve controller 106 of FIG. 1 further includes pressure gauges 124, 126, 128 to display respective measured and/or sensed pressures associated with corresponding ones of the inlet 118, the first outlet 120 and the second outlet 122 of the valve controller 106. Additional components and/or functions of the valve controller 106 are described below in connection with FIG. 2.

FIG. 2 is a block diagram of the known control valve apparatus 100 of FIG. 1, including the rotary valve 102, the dual-acting actuator 104, and the valve controller 106 thereof. In addition to the components described above in connection with FIG. 1, the dual-acting actuator 104 of the known control valve apparatus 100 further includes a position indicator 202. The position indicator 202 is operatively coupled to the piston of the dual-acting actuator 104 such that movement of the piston results in corresponding movement of the position indicator 202. As discussed above, a correlation exists between the position of the piston and the position of the flow control member 108. Thus, the position indicator 202 may provide an indication of the position of the piston and/or an indication of the position of the flow control member 108.

In addition to the components described above in connection with FIG. 1, the valve controller 106 of the known control valve apparatus 100 further includes control circuitry 204, a current-to-pressure (I.P) converter 206, and a relay 208. The control circuitry 204 includes and/or is operatively coupled to a processor 210, memory 212, an inlet pressure sensor 214, a first outlet pressure sensor 216, a second outlet pressure sensor 218, and a position sensor 220. The inlet pressure sensor 214 measures and/or determines the pressure of a pressurized control fluid 222 supplied by a control fluid source 224 to the inlet 118 of the valve controller 106. The first outlet pressure sensor 216 measures and/or determines the pressure of the pressurized control fluid 222 supplied by the relay 208 to the first outlet 120 of the valve controller 106. The second outlet pressure sensor 218 measures and/or determines the pressure of the pressurized control fluid 222 supplied by the relay 208 to the second outlet 122 of the valve controller 106. Although not shown in FIG. 2, the inlet pressure sensor 214, the first outlet pressure sensor 216, and/or the second outlet pressure sensor 218 may be operatively coupled to corresponding ones of the pressure gauges 124, 126, 128 described above in connection with FIG. 1.

The position sensor 220 is operatively coupled to the position indicator 202 of the dual-acting actuator 104. The position sensor 220 measures and/or determines the position of the flow control member 108 of the rotary valve 102 and/or the position of the piston of the dual-acting actuator 104 based on the indication provided by the position indicator 202. In some examples, the operative coupling between the position sensor 220 and the position indicator 202 may take the form of a mechanical linkage connecting the position indicator 202 to the position sensor 220. In other examples, the operative coupling may be electronic. In some such other examples, the operative coupling may be implemented via a magnet array and one or more Hall effect sensors.

Data and/or information obtained from and/or provided by any of the inlet pressure sensor 214, the first outlet pressure sensor 216, the second outlet pressure sensor 218 and/or the position sensor 220 may be stored in the memory 212. The processor 210 may access such data and/or information from the memory 212, or may alternatively receive such data and/or information directly from any of the inlet pressure sensor 214, the first outlet pressure sensor 216, the second outlet pressure sensor 218 and/or the position sensor 220.

The control circuitry 204 receives an input signal 226 corresponding to a desired position and/or condition of the flow control member 108 of the rotary valve 102. For example, the input signal 226 may indicate that the flow control member 108 is to be zero percent (0%) open (i.e., closed) relative to the valve body 110 of the rotary valve 102. In response to receiving the input signal 226, the control circuitry 204, via the processor 210, determines the current pressures associated with the inlet pressure sensor 214, the first outlet pressure sensor 216, and the second outlet pressure sensor 218, and further determines the current position of the flow control member 108 based on the current position associated with the position sensor 220. Based on such data and/or information, the control circuitry 204, via the processor 210, generates a drive signal 228 corresponding to a change in position of the piston of the dual-acting actuator 104 and/or to a change in position of the flow control member 108 of the rotary valve 102 to place the flow control member 108 at the desired position indicated by the input signal 226. The drive signal 228 is a variable current that changes based on continuous feedback obtained from and/or provided by the inlet pressure sensor 214, the first outlet pressure sensor 216, the second outlet pressure sensor 218, and/or the position sensor 220.

The variable current drive signal 228 generated by the control circuitry 204 is transmitted to the I/P converter 206. The I/P convener 206 is of a conventional design implemented in commercially available valve controllers such as, for example, in a Fisher® FIELDVUE DVC6200 Series digital valve controller. In addition to receiving the drive signal 228, the I/P converter 206 also receives the pressurized control fluid 222 supplied through the inlet 118 of the valve controller 106. In response to receiving the drive signal 228 and the pressurized control fluid 222, the I/P converter 206 generates a variable pressure 230 corresponding to the variable current drive signal 228.

The variable pressure 230 generated by the I/P converter 206 is transmitted to the relay 208. The relay 208 of FIG. 2 is a pneumatic relay having a conventional design implemented in commercially available valve controllers such as, for example, in a Fisher® FIELDVUE DVC6200 Series digital valve controller. The relay 208, and/or, more generally, the valve controller 106, may be calibrated in connection with a setup process. For example, during the setup process, the relay 208, and/or more generally, the valve controller 106, may receive an instruction and/or signal corresponding to a user calibration input that identifies, defines and/or determines a seating force corresponding to a pressure at which the relay 208 is to control the supply of the pressurized control fluid 222 to the dual-acting actuator 104. In such an example, the user calibration input may involve the user making one or more selection(s) from among one or more pre-configured list(s) of valve types and/or valve sizes stored in the memory 212 of the valve controller 106, where the valve type and/or valve size selected by the user corresponds to a valve type and/or a valve size associated with the rotary valve 102.

In addition to receiving the variable pressure 230, the relay 208 also receives the pressurized control fluid 222 supplied through the inlet 118 of the valve controller 106. Based on the variable pressure 230 and the pressurized control fluid 222, the relay 208 controls the distribution of the pressurized control fluid 222 to the first outlet 120 of the valve controller 106 and/or the second outlet 122 of the valve controller 106. Accordingly, the pressurized control fluid 222 is respectively supplied by the relay 208 to the first and/or second outlets 120, 122 of the valve controller 106 and, in turn, to the first and/or second ports 114, 116 of the dual-acting actuator 104.

The respective pressure(s) at which the pressurized control fluid 222 is supplied to the first and/or second ports 114, 116, as controlled by the relay 208 of the valve controller 106, cause a corresponding translational movement of the piston of the dual-acting actuator 104. A force and/or load generated by the translating piston is transformed into a torque, rotational force and/or rotational load on the valve shaft 112, which causes the flow control member 108 of the rotary valve 102 to rotate relative to the valve body 110. As described above, the relative movement of the piston and/or the flow control member 108 is conveyed by the position indicator 202 of the dual-acting actuator 104 to the position sensor 220 of the valve controller 106, thus providing a continuous feedback loop that may be used to update and/or adjust the variable current drive signal 228.

In the conventional control valve apparatus 100 described above in connection with FIGS. 1 and 2, the relay 208 is configured such that it typically opens the first outlet 120 of the valve controller 106 to the greatest extent possible (i.e., fully open) when the flow control member 108 of the rotary valve 102 reaches within approximately five percent (5%) of being fully closed, as determined by the position indicator 202 and the position sensor 220. When the first outlet 120 is fully open, the relay 208 provides the pressurized control fluid 222 to the first outlet 120 at a maximum pressure available based on the supply pressure generated at the control fluid source 224. As a result, a maximum seating force and/or load is applied to the fully-closed flow control member 108 and/or, more generally, to the fully-closed rotary valve 102. Similarly, the relay 208 typically opens the second outlet 122 of the of the valve controller 106 to the greatest extent possible (i.e., fully open) when the flow control member 108 of the rotary valve 102 reaches within approximately five percent (5%) of being fully open, as determined by the position indicator 202 and the position sensor 220. When the second outlet 122 is fully open, the relay 208 provides the pressurized control fluid 222 to the second outlet 122 at a maximum pressure available based on the supply pressure generated at the control fluid source 224. As a result, a maximum force and/or load is applied to the fully-open flow control member 108 and/or, more generally, to the fully-open rotary valve 102.

The conventional control valve apparatus 100 described above provides maximum forces or loads that are generally uniform with respect to the opening and closing of the flow control member 108 of the rotary valve 102. In valve applications that require a greater breakout torque, force or load to open the valve relative to the seating torque, force or load required to close the valve, the uniformity at which such maximum torques, forces or loads are applied results in an excessive seating force on the flow control member 108 and/or, more generally, on the rotary valve 102. The conventional control valve apparatus 100 does not provide the ability to reduce the maximum torque, force or load applied in connection with seating and/or closing the rotary valve 102 without simultaneously reducing the maximum torque, force or load applied in connection with opening the rotary valve 102. In contrast to the known control valve apparatus 100 described above in connection with FIGS. 1 and 2, each example control valve apparatus described herein in connection with FIGS. 3-5 provides the ability to independently reduce the maximum toque, force or load applied in connection with seating and/or closing the rotary valve 102 without simultaneously reducing the maximum toque, force or load applied in connection with opening the rotary valve 102.

Figure 3:
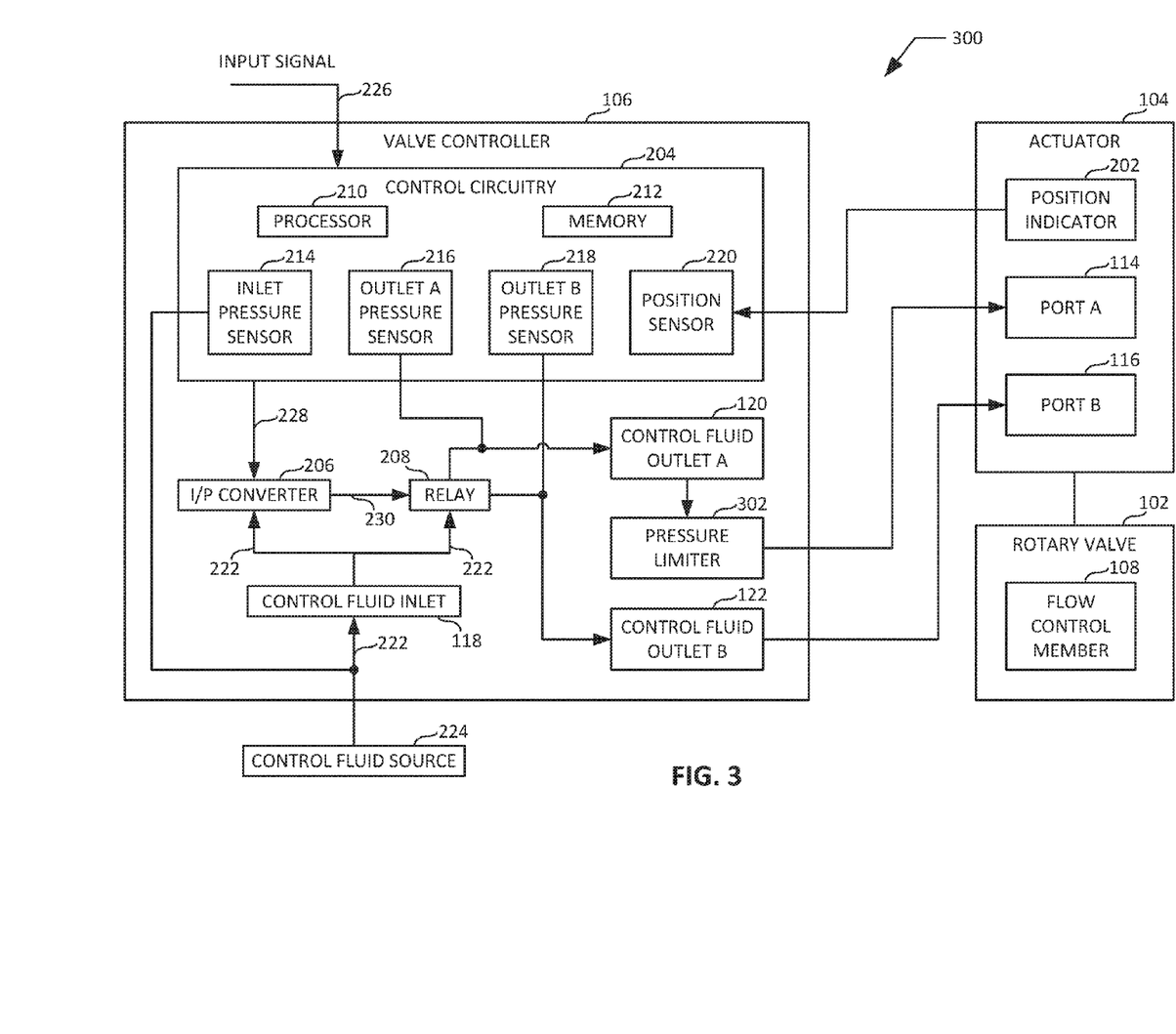
FIG. 3 is a block diagram of an example apparatus for independently controlling the seating force in a rotary valve.

FIG. 3 is a block diagram of an example control valve apparatus 300 for independently controlling the seating force in a rotary valve. In the illustrated example of FIG. 3, the example control valve apparatus 300 includes the components of the conventional control valve apparatus 100 described above in connection with FIGS. 1 and 2, and further includes an example pressure limiter 302. The pressure limiter 302 is operatively coupled to the valve controller 106 and fluidly coupled to the first port 114 of the dual-acting actuator 104. In the illustrated example of FIG. 3, the pressure limiter 302 is integrated within the valve controller 106. The pressure limiter 302 has a configurable setpoint that defines a maximum pressure at which the pressurized control fluid 222 exits the pressure limiter 302. In some examples, the pressure limiter 302 is a pressure regulator having a configurable setpoint. In other examples, the pressure limiter 302 is a pressure relief valve having a configurable setpoint.

In some examples, the setpoint of the pressure limiter 302 is manually configurable. For example, the setpoint of the pressure limiter 302 may be adjusted and/or configured by manually turning and/or manipulating a screw, knob, crank, handle or wheel (not shown), where the position of the screw, knob, crank, handle or wheel corresponds to a value of the setpoint. In other examples, the setpoint of the pressure limiter 302 is electronically configurable. For example, the setpoint of the pressure limiter 302 may be adjusted and/or configured in response to the pressure limiter 302 receiving an instruction and/or signal (not shown) corresponding to a user input that identifies, defines and/or determines a maximum pressure at which the pressurized control fluid 222 is to be provided to the first port 114 of the dual-acting actuator 104 in connection with seating and/or closing the flow control member 108 of the rotary valve 102. In such an example, the electronically-configurable pressure limiter 302 may include a current-to-pressure (I/P) converter (not shown) that associates the received electrical signal corresponding to the user input with the maximum pressure at which the pressurized control fluid 222 is to be provided to the first port 114.

Based on the configured setpoint, the pressure limiter 302 reduces, limits and/or restricts the pressure at which the pressurized control fluid 222 is provided to the first port 114 of the dual-acting actuator 104. For example, in an instance where the pressure limiter 302 is a pressure regulator, if the pressure limiter 302 is supplied with the pressurized control fluid 222 at a pressure of thirty pounds per square inch and the setpoint of the pressure limiter 302 is configured to twenty pounds per square inch, the pressure limiter 302 reduces the exit pressure of the pressurized control fluid 222 to twenty pounds per square inch. As a result, the pressurized control fluid 222 is provided to the first port 114 of the dual-acting actuator 104 at a pressure of twenty pounds per square inch. As another example, in an instance where the pressure limiter 302 is a pressure relief valve, if the pressure limiter 302 detects that the pressurized control fluid 222 is entering the pressure limiter 302 at a pressure of thirty pounds per square inch and the setpoint of the pressure limiter 302 is configured to twenty pounds per square inch, the pressure limiter 302 will vent a portion of the pressurized control fluid 222 to prevent the pressure at which the pressurized control fluid 222 exits the pressure limiter 302 from exceeding twenty pounds per square inch. As a result, the pressurized control fluid 222 is provided to the first port 114 of the dual-acting actuator 104 at a pressure of twenty pounds per square inch.

As a result of the reduction, limitation and/or restriction of the pressure provided by the pressure limiter 302, the seating force applied to the flow control member 108 of the rotary valve 102 when the flow control member 108 and/or the rotary valve 102 is in a closed position is reduced relative to the seating force that is otherwise applied by the conventional control valve apparatus 100 of FIGS. 1 and 2. As a further result of the reduction, limitation and/or restriction of the pressure provided by the pressure limiter 302, the pressure at which the pressurized control fluid 222 is provided to the second port 116 of the dual-acting actuator 104 when the flow control member 108 and/or the rotary valve 102 is in a fully-open position applies an opening force to the flow control member 108 of the rotary valve 102 that is greater than the seating force applied to the flow control member 108 of the rotary valve 102 when the flow control member 108 and/or the rotary valve 102 is in a fully-closed position. The configurable nature of the pressure limiter 302 provides the example control valve apparatus 300 of FIG. 3 with the ability to independently control and/or adjust the seating torque, force or load applied to the flow control member 108 of the rotary valve 102 when the flow control member 108 and/or the rotary valve 102 is in a fully-closed position.

Figure 4:
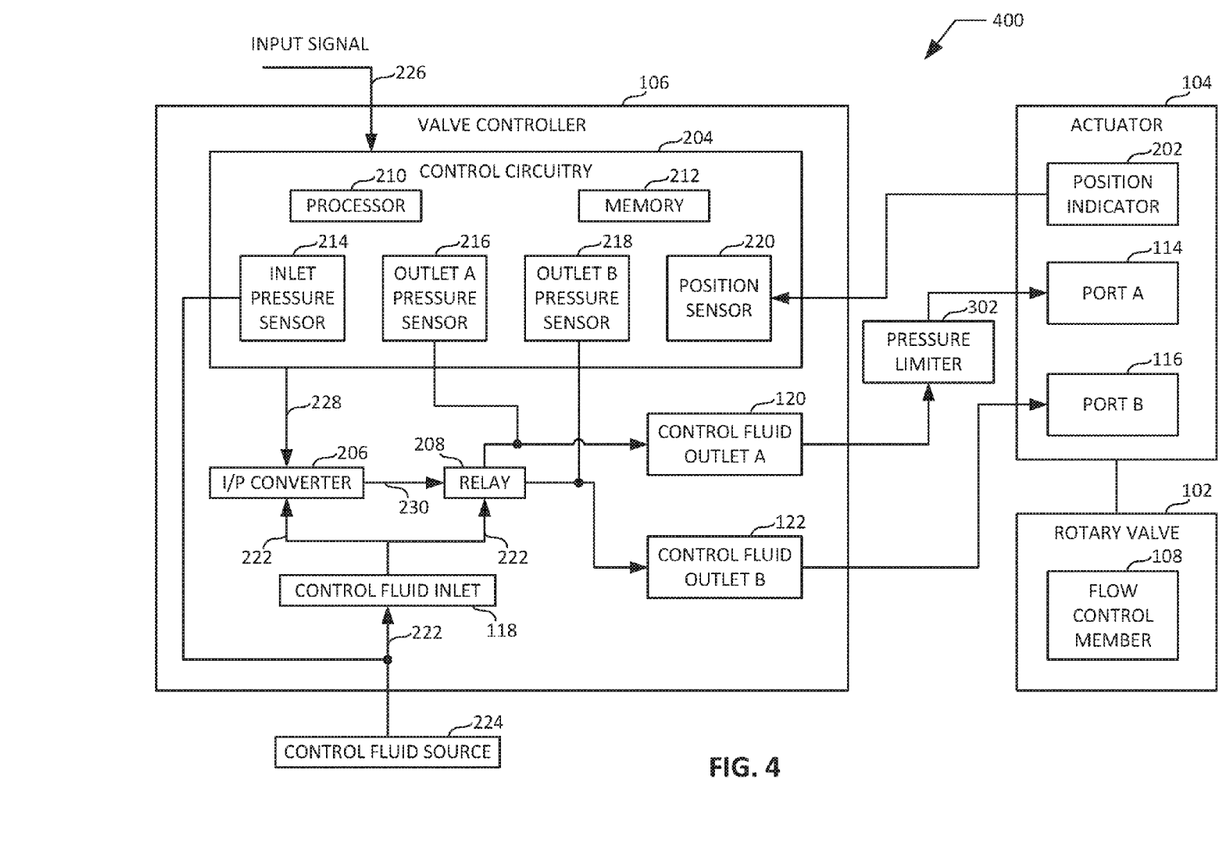
FIG. 4 is a block diagram illustrating an alternative configuration of the example pressure limiter of FIG. 3.

FIG. 4 is a block diagram of an alternative configuration 400 of the example pressure limiter 302 of FIG. 3. In contrast to the illustrated example of FIG. 3 that shows the pressure limiter 302 integrated within the valve controller 106, in the illustrated example of FIG. 4 the pressure limiter 302 is positioned outside of or external to the valve controller 106. The structure, function and operation of the pressure limiter 302 as illustrated in connection with FIG. 4 is otherwise the same as that described above in connection with FIG. 3.

Although certain methods and apparatus have been described herein, the scope of coverage of this patent is not limited thereto. On the contrary, this patent covers all methods and apparatus fairly falling within the scope of the appended claims either literally or under the doctrine of equivalents.

What is claimed is:

1. An apparatus, comprising:
   a rotary valve having a flow control member;
   a dual-acting actuator operatively coupled to the rotary valve, the dual-acting actuator having first and second ports to receive a pressurized control fluid to change a position of the dual-acting actuator;
   a valve controller operatively coupled to the dual-acting actuator to control the pressurized control fluid in response to a position of the rotary valve; and
   a pressure limiter operatively coupled to the valve controller and fluidly coupled to the first port to reduce a pressure of the pressurized fluid provided to the first port to reduce a seating force of the flow control member when the rotary valve is in a closed position; and
   wherein a pressure of the pressurized fluid provided to the second port provides an opening force of the flow control member, the opening force being greater than the seating force.

2. The apparatus as defined in claim 1, wherein the pressure limiter is integrated within the valve controller.

3. The apparatus as defined in claim 1, wherein the pressure limiter is electronically configurable.

4. The apparatus as defined in claim 1, wherein the pressure limiter is a pressure regulator.

5. The apparatus as defined in claim 1, wherein the pressure limiter is a pressure relief valve.

6. The apparatus as defined in claim 1, wherein the valve controller includes a relay to control a distribution of the pressurized control fluid to the first and second ports of the dual-acting actuator.

7. The apparatus as defined in claim 1, wherein the valve controller is a digital valve controller.

8. The apparatus as defined in claim 1, wherein the dual-acting actuator is a pneumatic piston actuator.

9. The apparatus as defined in claim 1, wherein the rotary valve is a torque seated rotary valve.

10. An apparatus, comprising:
a rotary valve having a flow control member:
a dual-acting actuator operatively coupled to the rotary valve, the dual-acting actuator having first and second ports to receive a pressurized control fluid to change a position of the dual-acting actuator; and
a valve controller operatively coupled to the dual-acting actuator to control the pressurized control fluid in response to a position of the rotary valve, the valve controller including a pressure limiter fluidly coupled to the first port to reduce a pressure of the pressurized fluid provided to the first port to reduce a seating force of the flow control member when the rotary valve is in a closed position; and
wherein a pressure of the pressurized fluid provided to the second port provides an opening force of the flow control member, the opening force being greater than the seating force.

11. The apparatus as defined in claim 10, wherein the pressure limiter is electronically configurable.

12. The apparatus as defined in claim 10, wherein the valve controller is a digital valve controller.

13. The apparatus as defined in claim 10, wherein the dual-acting actuator is a pneumatic piston actuator.

14. The apparatus as defined in claim 10, wherein the rotary valve is a torque seated rotary valve.

15. An apparatus, comprising:
a rotary valve having a flow control member:
an actuator means to receive a pressurized control fluid to change a position of the flow control member;
a valve control means to control the pressurized control fluid in response to a position of the flow control member; and
a pressure reducing means to reduce a seating force of the flow control member when the rotary valve is in a closed position; and
wherein the seating force of the flow control member when the rotary valve is in a closed position is less that an opening force of the flow control member when the rotary valve is in an open position.

16. The apparatus as defined in claim 15, wherein the pressure reducing means is integrated within the valve control means.

17. The apparatus as defined in claim 15, wherein the pressure reducing means is electronically configurable.

* * * * *